(12) United States Patent
Vahle

(10) Patent No.: US 12,519,327 B2
(45) Date of Patent: Jan. 6, 2026

(54) POWER SUPPLY UNIT FOR WALL MOUNTING

(71) Applicant: AUDI AG, Ingolstadt (DE)

(72) Inventor: Sebastian Vahle, Landshut (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 18/318,624

(22) Filed: May 16, 2023

(65) Prior Publication Data
US 2023/0378777 A1 Nov. 23, 2023

(30) Foreign Application Priority Data

May 17, 2022 (DE) .................. 102022112277.8

(51) Int. Cl.
H02J 7/00 (2006.01)
B60L 53/16 (2019.01)
B60L 53/30 (2019.01)
B60L 53/68 (2019.01)
B60L 55/00 (2019.01)

(52) U.S. Cl.
CPC ............ *H02J 7/0042* (2013.01); *B60L 53/16* (2019.02); *B60L 53/305* (2019.02); *B60L 55/00* (2019.02); *B60L 53/68* (2019.02)

(58) Field of Classification Search
CPC .... H02J 7/0042; H02J 3/322; H02J 13/00024; H02J 3/28; H02J 3/38; H02J 7/35; H02J 13/00022; H02J 2300/24; B60L 53/16; B60L 53/305; B60L 55/00; B60L 53/68; B60L 53/53; B60L 53/30; Y02T 10/70; Y02T 10/7072; Y02T 90/12; Y02T 90/14; Y02T 90/16; Y02T 90/167; Y04S 10/126
See application file for complete search history.

(56) References Cited

U.S. PATENT DOCUMENTS

| | | | |
|---|---|---|---|
| 2011/0204720 A1* | 8/2011 | Ruiz ..................... | B60L 53/305 307/66 |
| 2011/0258112 A1 | 10/2011 | Eder et al. | |
| 2013/0080254 A1 | 3/2013 | Thramann | |
| 2015/0239357 A1* | 8/2015 | Huntzicker ............ | B60L 53/68 701/22 |
| 2017/0106764 A1 | 4/2017 | Beaston et al. | |
| 2019/0351783 A1* | 11/2019 | Goei ....................... | B60L 53/63 |

(Continued)

FOREIGN PATENT DOCUMENTS

| | | |
|---|---|---|
| DE | 19938997 C1 | 12/2001 |
| DE | 102013200102 A1 | 7/2014 |
| DE | 102015213029 A1 | 1/2017 |

(Continued)

OTHER PUBLICATIONS

Office Action, dated Mar. 24, 2023, for German Patent Application No. 102022112277.8. (7 pages).

*Primary Examiner* — Rexford N Barnie
*Assistant Examiner* — Thai H Tran
(74) *Attorney, Agent, or Firm* — Seed Intellectual Property Law Group LLP

(57) ABSTRACT

The disclosure relates to a power supply unit mountable on or in a building (e.g., a wall box), which provides a power supply for the building and for alternating current charging of an electric vehicle (BEV, PHEV) as well as makes possible a communication via a satellite link, and a method of operating the power supply unit.

9 Claims, 1 Drawing Sheet

(56) References Cited

U.S. PATENT DOCUMENTS

2021/0184760 A1\* 6/2021 Kim ..................... H01Q 21/28
2022/0072970 A1 3/2022 Neudecker

FOREIGN PATENT DOCUMENTS

| DE | 102016104890 A1 | 9/2017 |
| DE | 102018115993 A1 | 1/2020 |
| DE | 102020123475 A1 | 3/2022 |
| JP | 2011166972 A | 8/2011 |

\* cited by examiner

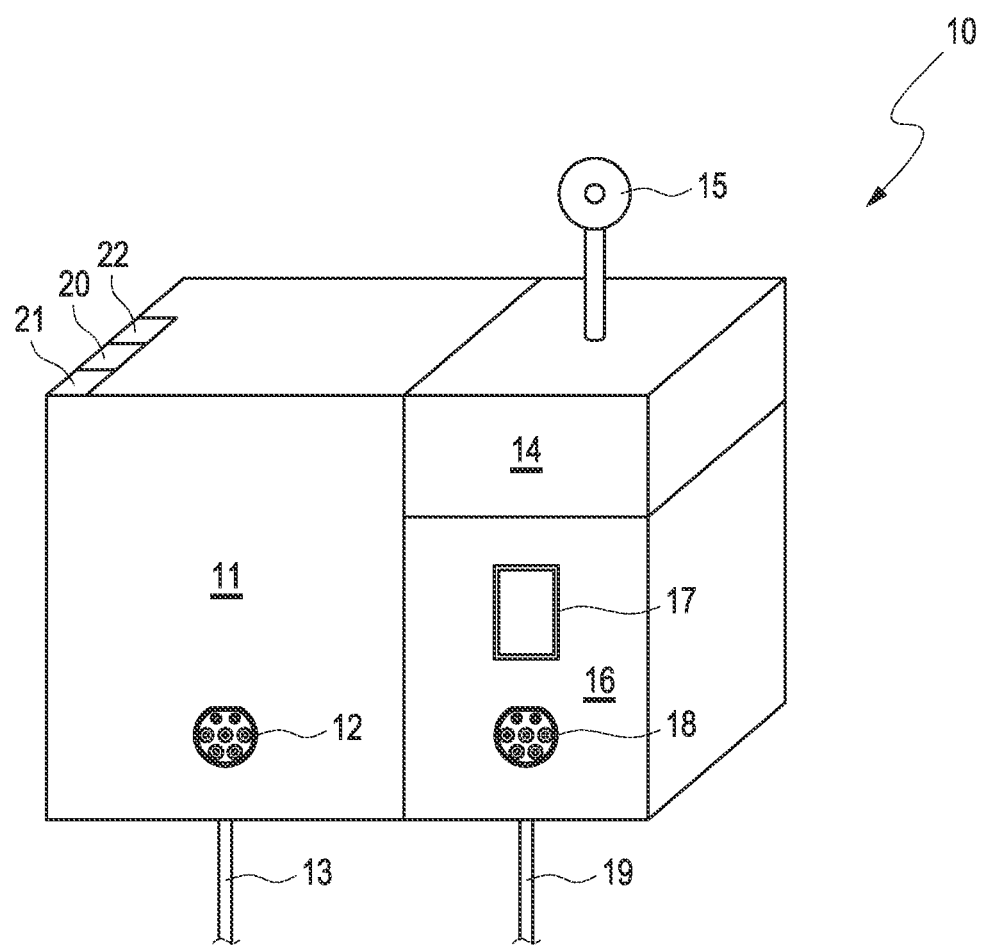

POWER SUPPLY UNIT FOR WALL MOUNTING

BACKGROUND

Technical Field

The disclosure relates to a power supply unit for wall mounting (wall box) on or in a building, which provides a power supply for the building and for the alternating current charging of an electric vehicle (Battery electric vehicle (BEV), Plug-in hybrid electric vehicle (PHEV)) as well as makes possible communication via a satellite link and a method for operating the power supply unit.

Description of the Related Art

Wall-mounted alternating current charging devices (wall boxes) are known, serving for the charging of PHEV and BEV vehicles. Buffer storages (power walls) are also known, serving for buffering of electrical energy, e.g., the electrical energy generated by a photovoltaic layout, or to make possible the drawing of electrical energy when electricity costs are favorable and putting out energy when electricity costs are high, or for the emergency power supply of a house. Moreover, satellite communication devices are known, serving for providing of broadband Internet, and fast charging stations (DC charging devices) with satellite communication are known.

A solar roof is found in US 2013/080, 254 A1, comprising at least one photovoltaic cell for the providing of energy. The energy is used as a renewable energy source for a station comprising at least one processor capable of wireless communication, which produces a wireless communication link to a mobile processor in a transmission area. Data are sent by the processor across the communication link to the mobile radio-capable device, the data pertaining to information associated with local establishments such as shops, restaurants, government offices, or the like. The solar roof can also be coupled to a battery, which can be a vehicle battery of an electric car or an electric scooter. The solar roof supplies electric energy either directly to the battery or across a voltage regulator and optionally a storage device.

US 2011/258,112 A1 discloses a system and a method for charging a vehicle across an electrical receptacle mounted on a wall box or a receptacle which is electrically connected to an electrical energy source. The method involves producing a connection between a communication module of the electrical receptacle mounted on the wall box or the plug-in socket and a communication network; receiving data on electrical energy sources; and automatically controlling charging of an electrical storage device of the vehicle based on the data of the electrical energy source.

US 2017/106,764 A1 relates to a battery-supported charging station. A battery system, which comprises multiple batteries and a battery management system software which controls the operation of the battery system, cooperates with a vehicle charging system, which charges the electric vehicle making use of stored energy which is provided by a battery system, or energy which is provided by a power supply grid.

BRIEF SUMMARY

Given this background, embodiments of the disclosure provide a device and a method that make possible a reliable power supply of a building even in crisis situations with loss of the public power supply and/or terrestrial communication, or provide communication or Internet connections in remote regions where no terrestrial communication is available, or in buildings not having any terrestrial communication.

One embodiment of the disclosure is a power supply unit for wall mounting on or in a building, comprising a buffer storage for electrical energy, an alternating current charging station, a satellite communication device, at least one bidirectional charging socket for electric vehicles, and at least one electrical connection to the public electrical grid.

The power supply unit according to the disclosure provides a power supply for the building and/or for an alternating current charging and/or a direct current charging of an electric vehicle (BEV, PHEV) and makes possible a communication via a satellite link.

The power supply unit according to the disclosure comprises at least one bidirectional charging socket for electric vehicles. In one embodiment of the power supply unit, a bidirectional charging socket is connected to the buffer storage. By the bidirectional charging socket, electrical energy can be exchanged between the buffer storage and an energy accumulator of an electric vehicle (BEV, PHEV), i.e., the buffer storage can be charged by the energy accumulator of the electric vehicle or the energy accumulator of the electric vehicle can be charged by the buffer storage. In another embodiment of the power supply unit, a bidirectional charging socket is connected to the alternating current charging station. By the bidirectional charging socket, electrical energy can be exchanged between the alternating current charging station and an energy accumulator of an electric vehicle (BEV, PHEV), i.e., the energy accumulator of the electric vehicle can be charged or the energy accumulator of the electric vehicle can provide electrical energy, which is transferred from the alternating current charging station to the building or to the buffer storage.

The power supply unit according to the disclosure comprises at least one electrical connection to the public electrical grid. In one embodiment of the power supply unit, the buffer storage has an electrical connection to the public electrical grid. In this way, the buffer storage can be charged via an AC/DC converter with electrical energy from the public electrical grid. In one embodiment, the buffer storage is connected to a bidirectional AC/DC converter, so that it can also provide alternating current for the building or for feeding into the public electrical grid. In another embodiment of the power supply unit, the alternating current charging station has an electrical connection to the public electrical grid. In this way, the alternating current charging station can draw electrical energy from the public electrical grid in order to charge an energy accumulator of an electric vehicle (BEV, PHEV) or the buffer storage. Likewise, the alternating current charging station can feed alternating current into the public electrical grid across the electrical connection.

In another embodiment, the power supply unit is connected to a photovoltaic layout. The electrical energy provided by the photovoltaic layout can be utilized to charge the buffer storage or an energy accumulator of an electric vehicle or it can be fed into the public electrical grid.

In one embodiment, the power supply unit has a current meter for alternating current and/or a current meter for direct current. In this way, the quantity of electrical energy fed into the public electrical grid can be measured. In one embodiment, the power supply unit has at least one ground fault circuit breaker.

The power supply unit according to the disclosure comprises a satellite communication device, making possible a communication via a satellite link. In one embodiment, the satellite communication device provides a broadband Internet connection. The Internet connection can also be used for intelligent regulation of the wall box and the buffer storage. In one embodiment, the power supply unit comprises a satellite antenna, which is connected to the satellite communication device. The satellite antenna can either be arranged directly at the power supply unit or be connected to it by a communication cable.

In one embodiment of the power supply unit, a data exchange occurs with the satellite communication device via a hard-wired terminal device. In another embodiment, the satellite communication device of the power supply unit is connected to at least one further unit making possible a wireless communication. In another embodiment, the power supply unit comprises a Bluetooth module. In another embodiment, the power supply unit comprises a Wireless Local Area Network (WLAN) modem. In another embodiment, the power supply unit comprises a Fourth Generation (4G) and/or Fifth Generation (5G) module. In another embodiment, the power supply unit comprises a Near Field Communication (NFC) module. In another embodiment, the power supply unit comprises a Radio Frequency Identification (RFID) reader for the identification of the user.

The functions of the power supply unit are controlled by a controller. In variants, the controller is connected to an external server, or the controller can be accessed through an application (app) on a mobile terminal device. In one embodiment, the power supply unit comprises an EEBUS interface.

In one embodiment, the power supply unit comprises an operating unit, with which control commands can be entered, and/or a display, on which operating parameters of the power supply unit or a user dialogue can be indicated, for example.

Another embodiment of the disclosure is a method for operating the power supply unit according to the disclosure, in which electrical energy stored in an energy accumulator of an electric vehicle connected to the power supply unit and/or in the buffer storage is utilized to provide a communication link and/or an Internet connection by way of the satellite communication device and/or to supply the building with electrical energy, especially in the form of alternating current.

Another embodiment of the disclosure is a method for operating the power supply unit according to the disclosure, in which electrical energy stored in the buffer storage is utilized to charge an energy accumulator of an electric vehicle connected to the power supply unit. In one embodiment, the energy accumulator is charged with direct current provided by the buffer storage to a bidirectional charging socket. In another embodiment, the energy accumulator is charged with alternating current provided by the alternating current charging station to a bidirectional charging socket. The method finds application in particular in event of an outage of the public power supply and/or terrestrial communication links, especially also mobile radio networks.

Thanks to the power supply unit according to the disclosure, comprising a wall box with integrated buffer storage and satellite communication device, a system is provided which enables an intelligent current management and which has its own internet connection via satellite communication. In this way, the dependence on the public electrical grid and terrestrial communication links is decreased, so that electrical energy and communication possibilities are available in crisis situations, even during an outage of the public infrastructure. Further benefits and embodiments of the disclosure will emerge from the specification and the drawing.

Of course the previously mentioned features can be used not only in the particular indicated combination, but also in other combinations or standing alone, without leaving the scope of the present disclosure.

BRIEF DESCRIPTION OF THE DRAWINGS

The disclosure is presented schematically with the aid of one embodiment in the drawing and shall be further described with reference to the drawing.

The FIGURE shows a schematic representation of one embodiment of the power supply unit according to the disclosure.

DETAILED DESCRIPTION

The FIGURE shows a schematic representation of one embodiment of a power supply unit 10 according to the disclosure, being mounted on an outer wall or inner wall of a building, for example on the inner wall of a garage. The power supply unit 10 comprises a buffer storage 11 (power wall) with a bidirectional charging socket 12, by which a BEV can be connected to the buffer storage 11, and an electrical connection 13 to the public alternating current grid across an AC/DC converter. The power supply unit 10 furthermore comprises a satellite communication device 14, which is designed as a satellite antenna 15, being arranged in the drawing at the power supply unit 10, or also alternatively as a separate device, and which can be connected by a cable to the satellite communication device 14. For example, the satellite antenna 15 can be mounted on the roof of the building. The power supply unit 10 also comprises an alternating current charging station 16 (wall box) with a bidirectional charging socket 18, by which a BEV can be connected to the wall box 16, and an electrical connection 19 to the public alternating current grid. In one embodiment not shown, the bidirectional charging socket 18 is omitted and in its place the bidirectional charging socket 12 is used. In addition or alternatively, the electrical connection 19 can also be omitted and in its place the electrical connection 13 for powering the wall box 16 can be used (via a branching upstream from the AC/DC converter).

In the embodiment shown, the power supply unit 10 comprises an operating unit 17 and/or a display 17. In one embodiment not shown, the power supply unit 10 comprises an EEBUS interface. In another embodiment, the power supply unit 10 comprises a ground fault circuit breaker.

In the embodiment shown, a Bluetooth modem 20, a WLAN modem 21 and a 4G/5G module 22 are additionally integrated in the power supply unit 10. In one embodiment not shown, the power supply unit 10 comprises a RFID reader. The units 20, 21, 22 are provided for data exchange with the satellite communication device 14 on the one hand and for wireless connection to mobile (terminal) devices, on the other hand. In alternative embodiments of the power supply unit 10, not all of the various units 20, 21, 22 for wireless communication are present.

The functions of the power supply unit 10 are controlled by a controller, not shown in the drawing. In variants, the controller is connected to an external server, or the controller can be accessed via an application (app) on a mobile terminal device.

In one embodiment not shown, the power supply unit 10 comprises a current meter for alternating current and/or a current meter for direction current. In another embodiment not shown, the power supply unit 10 is connected to a photovoltaic layout.

German patent application no. 102022112277.8, filed May 17, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A power supply unit mountable on or in a building, comprising:
   a buffer storage which, in operation, stores electrical energy;
   an alternating current charging station;
   a satellite communication device which, in operation, uses the electrical energy provided by the buffer storage to provide a communication link or a network connection used to regulate the buffer storage and the alternating current charging station;
   a first bidirectional charging socket connected to the buffer storage, wherein the first bidirectional charging socket, in operation, is connected to a first electric vehicle and enables electrical energy to be transferred (i) from the buffer storage to an energy accumulator of the first electric vehicle and (ii) from the energy accumulator of the first electric vehicle to the buffer storage;
   a second bidirectional charging socket different from the first bidirectional charging socket and connected to the alternating current charging station, wherein the second bidirectional charging socket, in operation, is connected to at a second electric vehicle and enables electrical energy to be transferred (i) from the alternating current charging station to an energy accumulator of the second electric vehicle and (ii) from the energy accumulator of the second electric vehicle to the alternating current charging station, wherein the alternating current charging station transfers the electrical energy from the energy accumulator of the second electric vehicle to the buffer storage; and
   at least one electrical connection which, in operation, is connected to a public electrical grid.

2. The power supply unit according to claim 1, wherein a first one of the at least one electrical connection, in operation, connects the buffer storage to the public electrical grid.

3. The power supply unit according to claim 2, wherein a second one of the at least one electrical connection, in operation, connects the alternating current charging station to the public electrical grid.

4. The power supply unit according to claim 1, further comprising a satellite antenna connected to the satellite communication device.

5. The power supply unit according to claim 1, further comprising a Bluetooth communication device which, in operation, communicates using Bluetooth communications and exchanges data with the satellite communication device.

6. The power supply unit according to claim 5, comprising a Wireless Local Area Network (WLAN) communication device which, in operation, communicates using a WLAN and exchanges data with the satellite communication device.

7. The power supply unit according to claim 6, further comprising a Fourth Generation (4G) or a Fifth Generation (5G) communication device which, in operation, communicates according to a 4G or a 5G cellular communication standard and exchanges data with the satellite communication device.

8. A method of operating a power supply unit mountable on or in a building, the power supply unit including a buffer storage, an alternating current charging station, a satellite communication device, a first bidirectional charging socket connected to the buffer storage, a second bidirectional charging socket different from the first bidirectional charging socket and connected to the alternating current charging station, and at least one electrical connection connectable to a public electrical grid, the method comprising:
   transferring, by the first bidirectional charging socket, electrical energy from the buffer storage to an energy accumulator of a first electric vehicle;
   transferring, by the first bidirectional charging socket, electrical energy from the energy accumulator of the first electric vehicle to the buffer storage;
   transferring, by the second bidirectional charging socket, electrical energy from the alternating current charging station to an energy accumulator of a second electric vehicle;
   transferring, by the second bidirectional charging socket, electrical energy from the energy accumulator of the second electric vehicle to the alternating current charging station;
   transferring, by the alternating current charging station, the electrical energy from the energy accumulator of the second electric vehicle to the buffer storage;
   providing electrical energy stored in the buffer storage of the power supply unit to the satellite communication device;
   providing a communication link or a network connection using the satellite communication device and the electrical energy provided by the buffer storage;
   regulating the buffer storage and the alternating current charging station using the communication link or the network connection provided via the satellite communication device; and
   providing electrical energy to the building using the electrical energy stored in the buffer storage of the power supply unit or the electrical energy stored in the energy accumulator of the first electric vehicle connected to the power supply unit.

9. The method according to claim 8, wherein the electrical energy provided to the building is in a form of alternating current.

* * * * *